United States Patent [19]

Shaw et al.

[11] 4,023,951
[45] May 17, 1977

[54] TREATMENT OF GLASS

[75] Inventors: Bryan Shaw; Neil Winterton, both of Runcorn, England

[73] Assignee: Imperial Chemical Industries Limited, London, England

[22] Filed: Aug. 25, 1975

[21] Appl. No.: 607,544

[30] Foreign Application Priority Data

Sept. 25, 1974 United Kingdom ............ 41686/74
Aug. 4, 1975 United Kingdom ............ 32486/75

[52] U.S. Cl. ............................... 65/30 R; 65/30 E;
65/60 B; 427/384; 427/430 B
[51] Int. Cl.$^2$ ........................................ C03C 17/00
[58] Field of Search ............... 65/30 R, 30 E, 60 B, 252/DIG. 10; 427/384, 399, 430 B

[56] References Cited

UNITED STATES PATENTS

| | | | |
|---|---|---|---|
| 2,662,037 | 12/1953 | Levi | 65/60 B X |
| 2,943,059 | 6/1960 | Beck et al. | 65/30 R X |
| 3,171,768 | 3/1965 | Levengood | 65/30 R X |
| 3,259,517 | 7/1966 | Atwell | 65/30 R X |

*Primary Examiner*—Robert L. Lindsay, Jr.
*Attorney, Agent, or Firm*—Cushman, Darby & Cushman

[57] ABSTRACT

A process for strengthening or toughening a phosphate glass the process comprising contacting the surface of the phosphate glass with a solution of a carboxylic acid in a liquid diluent, the carboxylic acid comprising an amino-carboxylic acid, or a hydroxy-carboxylic acid, or a mixture of an amino-carboxylic acid and a hydroxy-carboxylic acid. Particularly useful is an aqueous solution of an amino-polycarboxylic acid.

10 Claims, No Drawings

TREATMENT OF GLASS

This invention relates to a process for the treatment of glass to increase its strength or toughness, and in particular to increase its flexural strength and its resistance to breakage by impact. In particular the invention relates to a process for the strengthening or toughening by chemical treatment of a glass containing a high proportion of phosphorus oxide, $P_2O_5$, such a glass being commonly termed a phosphate glass.

It is known that glass, especially silicate glass, may be strengthened or toughened by heating it at an elevated temperature below the softening point of the glass followed by rapid cooling of the surface of the glass. A substantial increase in strength or toughness can be achieved in this way, but the technique suffers the disadvantage that it cannot be employed for the treatment of very thin articles such as lenses and slides of thickness less than 3 mm, especially in a commercially operated process. It is also known that glass containing a high content of silica can be strengthened or toughened by chemical treatment involving ion exchange between metals ions in the surface of the glass and an ionic treatment medium. For example, it is known to treat silicate glasses containing sodium with solutions or melts of potassium salts in order to promote simple one-for-one ion exchange between sodium ions in the glass and the potassium ions of the solution or melt. However, when such an ion exchange treatment is applied to a phosphate glass containing a high proportion, for example more than 50 mole %, of $P_2O_5$, we have found that the treatment does not result in any appreciable strengthening or toughening of the glass.

A further known treatment for strengthening or toughening glass, especially silicate glass, involves etching the glass to remove a surface layer from the glass and so remove cracks and other imperfections. These surfaces imperfections provide points or lines of weakness from which cracks spread until the glass breaks and their removal results in increased strength or toughness in the glass.

An example of a suitable etching medium for silicate glass is aqueous or gaseous hydrogen fluoride. This etching process has the disadvantage that although the freshly etched glass has improved strength or toughness, the etched surface rapidly deteriorates when the glass is subsequently handled as surface imperfections, and thus points or lines of weakness, reappear.

We have now devised a process for the treatment of phosphate glass which strengthens or toughens the glass and which does not involve a heat treatment followed by rapid cooling and so may be used to treat thin articles, which does not involve simple one-for-one ion exchange, and which produces a surface which does not deteriorate rapidly when the glass is subsequently handled. The process can be operated at ordinary temperatures and pressures and is inexpensive.

According to the present invention there is provided a process for the treatment of a phosphate glass which process comprises contacting the surface of a phosphate glass with a solution of a carboxylic acid in a liquid diluent, the carboxylic acid comprising an amino-carboxylic acid, or a hydroxy-carboxylic acid, or a mixture of an amino-carboxylic acid and a hydroxy-carboxylic acid.

Within the scope of the term "carboxylic acid" we include metal salts of carboxylic acids, for example, alkali metal salts, e.g., sodium salts.

The carboxylic acid is preferably a polycarboxylic acid, that is, a carboxylic acid containing two or more carboxylic acid groups. Amino-carboxylic acids, especially, amino-polycarboxylic acids are preferred as the amount of strengthening or toughening of phosphate glasses which can be achieved by treatment with solutions of these latter acids in generally greater than can be achieved by treatment of phosphate glasses with solutions of hydroxycarboxylic acids.

By the term "amino-carboxylic acid" we mean a compound containing a carboxylic acid group (—COOH), and in a polycarboxylic acid two or more such groups, and at least one —$NH_2$, —NH—, or =N— group.

The carboxylic acid used in the process of the invention is capable of forming a chelated chemical complex with metal cations in solution, especially in aqueous solution.

The process of the invention is simple to operate and merely involves maintaining contact between the surface of the glass and the solution of the carboxylic acid for the desired period of time. Contact between the glass and the solution is usually effected by immersing the glass in the solution although other techniques may be employed if desired. For example, if it is desired to treat only one surface of the glass then the solution of the carboxylic acid may be poured onto the glass or alternatively the glass may be floated on the solution of the carboxylic acid.

The carboxylic acid should be soluble in the liquid diluent at least to the extent that a solution of the desired strength may be obtained for use in the process of the invention. The liquid diluent may be an organic diluent or may comprise in part an organic diluent in admixture with water. However, water is the most preferred diluent as it is generally in aqueous solutions that the desired amounts of carboxylic acid may readily be dissolved.

Increasing the concentration of the carboxylic acid in the solution generally increases the rate at which the glass is strengthened or toughened. In general the concentration of carboxylic acid in solution will not be above 1 mole per liter as above this concentration difficulty may be experienced in achieving adequate solubility. However, the use of solutions having a strength of greater than 1 mole per liter is not excluded. The concentration of carboxylic acid in solution will also generally be at least 0.05 mole per liter as below this concentration the process of the invention may need to be operated for an undesirably long time in order to achieve a desired amount of strengthening or toughening of the glass. In general the solubility of the carboxylic acid will increase with increase in temperature and it is possible that where the process of the invention is operated at an elevated temperature the carboxylic acid will be present in an amount which is capable of being dissolved in the liquid diluent to form a solution at the elevated temperature at which the process is operated but which is incapable of being dissolved completely by the diluent at ambient temperature. A preferred concentration of carboxylic acid is in the range 0.1 to 0.8 mole per liter.

The pH of the solution of the carboxylic acid usually will be in the range from 4 to 12, preferably from 5 to 10. We especially prefer to use solutions of pH greater than 6.5 and in particular we prefer solutions of pH from 7.0 to 9.0 The pH of the solution conveniently is adjusted to this preferred range, if necessary, by addition of sodium hydroxide to the solution.

The temperature at which the process is operated is not critical but it clearly should be below the softening point of the phosphate glass and between the freezing point and boiling point of the solution of the carboxylic acid. Especially in the case of an aqueous solution of the carboxylic acid the temperature usually will be in the range 0° to 100° C, although a temperature above 100° C may be employed, for example, by carrying out the process under superatmospheric pressure. We have found that the rate at which the glass is strengthened or toughened increases as the temperature at which the process is operated is increased. The effect of the temperature of operation on the rate of strengthening or toughening may be appreciable, for example, operation at about 0° C may require up to 10 hours to achieve a particular degree of strengthening or toughening whilst operation at about 100° C may require only about 5 minutes to achieve the same degree of strengthening or toughening. There is generally no advantage in practice in operating at temperatures below room temperature. A preferred temperature range is 20° to 80° C.

The time for which the glass is treated in the process of the invention will depend upon the particular glass and carboxylic acid used, the temperature at which the process is operated, the concentration of the carboxylic acid in the solution, and the degree of strengthening or toughening required. In general treatment times of from 5 minutes to 10 hours are suitable; typical treatment times are from 20 minutes to 3 hours.

Relative movement between the glass being treated and the solution of the carboxylic acid may tend to increase the rate of strengthening or toughening of the glass and means may be provided for moving the glass in the solution or alternatively for agitating the solution, for example by stirring or pumping or by circulating the solution through the treatment vessel.

After the glass has been treated in the process of the invention it may suitably be washed with water and/or with an organic liquid, e.g., acetone, and dried.

Amino-carboxylic acids which may be used in the process of the present invention include N-substituted amines, for example, N-substituted diamines. The amines may be aliphatic, for example, N-substituted alkylene diamines, e.g., ethylene diamine tetra-acetic acid and 1,2-propylene diamine tetraacetic acid; aromatic, e.g., p-phenylene diamine N,N, N',N' tetra-acetic acid; or cyclo-aliphatic, e.g., cyclohexane diamine tetra-acetic acid. Other suitable amino-carboxylic acids include imido-diacetic acid, glycine and nitrio-triacetic acid. A suitable salt of a carboxylic acid is the disodium salt of ethylene diamine tetra-acetic acid.

Hydroxy carboxylic acids which may be used in the process of the present invention include hydroxy acids having the structure

where $m$ is zero or an integer, $n$ is an integer, and R is an organic group and is preferably carboxyl —COOH, or a structure in which some at least of the carbon atoms carry substituent groups in place of hydrogen atoms. Suitable hydroxy carboxylic acids include tartaric acid and citric acid.

The solution used in the process of the invention may contain one or more aminocarboxylic acids and/or one or more salts thereof and/or one or more hydroxycarboxylic acids and/or one or more salts thereof.

Any phosphate glass, that is any glass containing a high proportion of phosphate and derived from mixtures wherein the principal glass-forming oxide is phosphorus oxide, $P_2O_5$, may be strengthened or toughened by the process of the invention. The process is particularly suited to the treatment of glass derived from glass-forming mixtures wherein $P_2O_5$, or a precursor thereof, constitutes at least 50 mole percent, and preferably at least 60 mole percent, of the total glass-forming oxides. The sensitivity of phosphate glasses to water generally increases with increase in the $P_2O_5$ content and a $P_2O_5$ content of not greater than 75 mole percent is preferred as above this value the phosphate glass may be unduly sensitive to water.

Suitable phosphate glasses include the glasses described in our British patent specifications Nos. 1356919, 1369240, 1371377 and 1395942 the disclosures of which are incorporated herein. These patent specifications also described methods by which phosphate glasses may be prepared from a mixture of oxides or precursors of the oxides.

The phosphate glass may in addition contain one or more alkali metal oxides, e.g., $Li_2O$, $K_2O$, $Na_2O$, $Rb_2O$, $Cs_2O$; one or more alkaline earth metal oxides for improved durability to water, e.g., BaO, CaO, MgO or SrO; $B_2O_3$ which improves the durability of the glasses to water and which, especially at low levels of $B_2O_3$, reduces the tendency of crystallites to form in the glass; PbO or $Sb_2O_3$ or a mixture thereof in order to control the refractive index of the glass; or oxides of one or more of Cd, Zn, V, Cr, W, Bi, Si, Ag, Cu, Au, Te, Al, Cr, Mo, or hydrogen in the form of combined water.

A preferred glass comprises in mole %, $P_2O_5$ 50 to 72, $B_2O_3$ 1.2 to 3.5, PbO 0 to 30, one or more transition metal oxides 0 to 5, and one or more oxides selected from alkali metal oxides, alkaline earth metal oxides and zinc oxide 2 to 40, and preferably at least 5 mole %, and more preferably at least 10 mole % of one or more of these latter oxides. This latter glass preferably includes at least one alkali metal oxide and at least one oxide selected from alkaline earth metal oxides and zinc oxide. For the purposes of definition of the mole % composition water is excluded from the composition quoted above. However, water may be present in the glass composition in a proportion of up to 5 weight % of the glass composition.

By transition metal oxide we mean an oxide of a metal in Groups IIIA, IVA, VA, VIA, VIIA, VIII or IB of the Periodic Table of the Elements as given on the inside back cover of "Advanced Inorganic Chemistry" by F A Cotton and G Wilkinson, 2nd Edition 1966, Interscience Publishers, and including an oxide of the lanthanide and actinide series.

A preferred phosphate glass has the following mole % composition, $P_2O_5$ 63.1, $B_2O_3$ 2.25, $Na_2O$ 13.5, $Li_2O$ 7.65, MgO 4.5, CaO 4.5 and PbO 4.5.

Glass which has been treated by the process of the invention may be used in applications in which toughened glass is normally employed. Glass articles of simple profile, for example sheets and fibres, may be treated as also may shaped articles of complex profile. The process is especially suitable for treating thin articles which cannot be strengthened or toughened satisfactorily by heat treatment, but is not limited to treatment of thin articles. Specific uses of the process include the strengthening or toughening of optical lenses and slides.

The invention is illustrated by the following examples.

EXAMPLE 1

Rods of mean diameter approximately 3 mm were drawn from a molten phosphate glass having the composition $P_2O_5$ 63.1, $LiO_2$ 7.65, $Na_2O$ 13.5, MgO 4.5, CaO 4.5, PbO 4.5 and $B_2O_3$ 2.25. The composition is expressed in terms of the mole percentages of the components of the composition notionally present in the mixture from which the glass was formed, and the glass was made following the procedure generally described in Example 1 of British patent specification No. 1395942. The rods were cut into lengths of approximately 80 mm.

10 rods were immersed in a 0.5M solution of ethylene diamine tetra-acetic acid in water at a temperature of 61° C, the pH of the solution having been adjusted to 8.0 by addition of sodium hydroxide. The solution was stirred. After 30 minutes the rods were removed from the solution, rinsed with water and dried and the flexural strength of each rod was determined using a Hounsfield Tensometer fitted with a quarter point bend test arrangement with the outer load points 0.064 m apart.

The strain rate used in the test was 0.014 m/min and the flexural strength was determined using the following equation $$\text{Stress per unit area (MNm}^{-2}) = \frac{4 \text{ PL}}{d^3}$$

where
P is the applied load at fracture,
L is the span between the outer load points, and
d is the diameter of the rod (m).

The mean flexural strength of the rods was 460 $MNm^{-2}$ with a standard deviation of 121 $MNm^{-2}$.

By way of comparison 20 rods which had not been treated by immersion in a solution of ethylene diamine tetra-acetic acid had a mean flexural strength of 197 $MNm^{-2}$ with a standard deviation of 63 $MNm^{-2}$.

EXAMPLE 2

20 glass rods made following the procedure described in Example 1 were immersed in a 0.5M aqueous solution of nitrilotriacetic acid at a temperature of 61° C, the pH of the solution having been adjusted to 7.0 by addition of sodium hydroxide. The solution was stirred. After 95 minutes the rods were removed from the solution, rinsed with water and dried, and the mean flexural strength of the rods was determined following the procedure described in Example 1.

The mean flexural strength of the rods was 438 $MNm^{-2}$ with a standard deviation of 139 $MNm^{-2}$.

By way of comparison 20 rods which had not been treated by immersion in a solution of nitrilotriacetic acid had a mean flexural strength of 251 $MNm^{-2}$ with a standard deviation of 86 $MNm^{-2}$.

EXAMPLE 3

20 glass rods made following the procedure described in Example 1 were immersed in a 0.5M aqueous solution of the disodium salt of ethylene diamine tetra-acetic acid, the pH of the solution having been adjusted to pH 7.4 by addition of sodium hydroxide. The temperature of the solution was 62° C and the solution was stirred. After 240 minutes the rods were removed from the solution, rinsed with water and dried, and the mean flexural strength of the rods was determined following the procedure described in Example 1.

The mean flexural strength of the rods was 468 $MNm^{-2}$ with a standard deviation of 74 $MNm^{-2}$.

EXAMPLES 4 and 5

The procedure of Example 1 was followed in two separate Examples except that in a first experiment the solution used was a 0.5M aqueous solution of tartaric acid and in a second experiment the solution used was a 0.5M aqueous solution of citric acid. In both experiments 40 rods were immersed in the solutions, the temperature of the solutions was 60° C, the pH of the solutions was 7.4, and the immersion time was 4 hours.

The mean flexural strengths of the rods were as follows:

| | | | |
|---|---|---|---|
| Example 4 | - Tartaric acid solution treatment | - | 335 $MNm^{-2}$ |
| | Standard deviation | | 95 $MNm^{-2}$ |
| Example 5 | - Citric acid solution treatment | - | 371 $MNm^{-2}$ |
| | Standard deviation | | 102 $MNm^{-2}$ |

EXAMPLES 6 to 10

The procedure of Example 1 was followed in five separate Examples the solutions used, the pH, the temperature, the immersion times, and the number of rods tested, being as follows.

EXAMPLE 6

0.5M aqueous solution of ethylene diamine tetra-acetic acid, pH 7.4, 61° C, 4 hours, 40 rods.

EXAMPLE 7

0.5M aqueous solution of ethylene diamine tetra-acetic acid, pH 7.4, 61° C, 24 hours, 10 rods.

EXAMPLE 8

0.5M aqueous solution of ethylene diamine tetra-acetic acid, pH 7.4, 40° C, 4 hours, 20 rods.

EXAMPLE 9

0.1M aqueous solution of ethylene diamine tetra-acetic acid, pH 7.4, 60° C, 4 hours, 20 rods.

EXAMPLE 10

0.01M aqueous solution of ethylene diamine tetra-acetic acid, pH 7.4, 60° C, 4 hours, 20 rods.

The flexural strength results were as follows:

| Example | Mean Flexural Strength | Standard Deviation |
|---|---|---|
| 6 | 683 $MNm^{-2}$ | 264 $MNm^{-2}$ |
| 7 | 824 $MNm^{-2}$ | 337 $MNm^{-2}$ |
| 8 | 562 $MNm^{-2}$ | 93 $MNm^{-2}$ |
| 9 | 472 $MNm^{-2}$ | 132 $MNm^{-2}$ |
| 10 | 384 $MNm^{-2}$ | 99 $MNm^{-2}$ |

EXAMPLES 11 and 12

The procedure of Example 1 was followed in two separate Examples the solutions used, the pH, the temperature, the immersion times, and the number of rods tested being as follows:

EXAMPLE 11

0.5M aqueous solution of p-phenylenediamine N,N,N',N'-tetra-acetic acid, pH 7.0, 61° C, 5 hours, 20 rods.

EXAMPLE 12

0.5M aqueous solution of glycine, pH 7.0, 61° C, 4 hours, 20 rods.

The flexural strength results were as follows:

| Example | Mean Flexural Strength | Standard Deviation |
|---|---|---|
| 11 | 481 $MNm^{-2}$ | 80 $MNm^{-2}$ |
| 12 | 426 $MNm^{-2}$ | 100 $MNm^{-2}$ |

EXAMPLE 13

A glass having a composition the same as that described in Example 1 was formed into a disc having a diameter of 6.3 cm and the disc was polished to provide optically smooth surfaces. The average thickness of the disc was 1.5 mm.

The disc was immersed in a stirred 0.5M aqueous solution of ethylene diamine tetra-acetic acid of pH 7.4 at a temperature of 61° C. The disc was removed from the solution after 4 hours and washed with water and acetone and dried in air.

The edges of the disc were clamped between foam rubber gaskets, the disc was mounted horizontally, and a steel ball of weight 44g was dropped onto the disc from a height of 30 cm. The height from which the ball was dropped was increased progressively in 20 cm steps until the ball was dropped from a height at which fracture of the disc occurred, or until a height of 193 cm had been reached and the disc had not fractured.

The disc treated as described above had not broken when a height of 193 cm had been reached.

By way of comparison a disc having an average thickness of 1.7 mm was similarly tested, in this case the treatment with ethylene diamine tetra-acetic acid having been omitted. The disc broke when the steel ball was dropped from a height of 120 cm.

EXAMPLES 14 to 17

In four separate Examples the procedure described in Example 13 was repeated except that the discs used had thicknesses different from that of the disc used in Example 13. In each Example the disc was treated with the aqueous solution of ethylene diamine tetra-acetic acid and tested in the steel ball test, and for the purpose of comparison a disc which had not been treated with the aqueous solution of ethylene diamine tetra-acetic acid was similarly tested.

The results of the tests are presented in the following Table.

| Example | Thickness of Disc mm | Steel Ball Test. Height from which Fracture Occurred mm |
|---|---|---|
| 14 | 1.8 | 170 |
| Comparison | 1.8 | 30 |
| 15 | 1.9 | 170 |
| Comparison | 2.0 | 110 |
| 16 | 2.0 | Did not break |
| Comparison | 2.1 | 50 |
| 17 | 2.1 | Did not break |
| Comparison | 2.1 | 30 |

We claim:

1. A process for the strengthening of a phosphate glass which contains at least 50 mole % $P_2O_5$, which process comprises contacting a surface of a phosphate glass with a solution of 0.05 to 1.0 mole per liter of a carboxylic acid in a liquid diluent at a temperature in the range of 0° to 100° C, the solution having a pH in the range 4 to 12, the carboxylic acid comprising an amino-carboxylic acid, or a hydroxy-carboxylic acid, or a mixture of an amino-carboxylic acid and a hydroxy-carboxylic acid.

2. A process as claimed in claim 1 in which the carboxylic acid comprises a polycarboxylic acid.

3. A process as claimed in claim 2 in which the surface of a phosphate glass is contacted with a solution of an amino polycarboxylic acid.

4. A process as claimed in claim 1 in which the phosphate glass is contacted with an aqueous solution of a carboxylic acid.

5. A process as claimed in claim 1 in which the solution has a pH in the range 5 to 10.

6. A process as claimed in claim 1 in which the temperature of the solution is in the range 20° to 80° C.

7. A process as claimed in claim 1 in which the phosphate glass contains at least 60 mole % of $P_2O_5$.

8. A process as claimed in claim 1 in which the phosphate glass has a composition (in mole %)

$P_2O_5$ 50 to 72
$B_2O_3$ 1.2 to 3.5
PbO 0 to 30 transition metal oxide 0 to 5 oxide or oxides selected from alkali metal oxides, alkaline earth metal oxides and zinc oxide 2 to 40.

9. A process as claimed in claim 1 in which carboxylic acid is ethylene diamine tetra-acetic acid, nitrilotriacetic acid, a disodium salt of ethylene diamine tetra-acetic acid, p-phenylene diamine N,N,N',N' tetra-acetic acid, citric acid, tartaric acid, or glycine.

10. A process as claimed in claim 1 in which the glass is in the form of a lens.

* * * * *